United States Patent [19]

Cheng et al.

[11] Patent Number: 5,491,384
[45] Date of Patent: Feb. 13, 1996

[54] LIGHT SOURCE FOR A CONTACT IMAGE SENSOR

[75] Inventors: Cheden Cheng, Taipei Hsien; Shih S. Huang, Taipei; Tsung M. Ko, Taipei Hsien; Hsin C. Su, Taipeihsien, all of Taiwan

[73] Assignee: Dyna Image Corporation, Taipei, Taiwan

[21] Appl. No.: 297,781

[22] Filed: Aug. 30, 1994

[51] Int. Cl.⁶ ....................................................... G09G 3/10
[52] U.S. Cl. ........................................ 315/169.3; 359/363
[58] Field of Search .............................. 315/169.3, 169.4; 313/346 R; 359/363

[56] References Cited

U.S. PATENT DOCUMENTS 5,283,501 2/1994 Zhu et al. .............................. 315/169.3
5,294,870 3/1994 Tang et al. ............................ 315/169.3

Primary Examiner—Robert J. Pascal
Assistant Examiner—Reginald A. Ratliff
Attorney, Agent, or Firm—Browdy and Neimark

[57] ABSTRACT

A light source for a contact image sensor, including an electroluminescent screen fastened to the scanning face glass of a contact image sensor at the back either by bonding or printing and having a narrow gap through which reflected light from document passes to the lens of the contact image sensor.

1 Claim, 3 Drawing Sheets

LIGHT SOURCE FOR A CONTACT IMAGE SENSOR

BACKGROUND OF THE INVENTION

CIS (contact image sensor) has been intensively used in fax machines for scanning document image and converting it into electronic signals. FIG. 1 shows a CIS according to the prior art, which comprises a housing 1, a LED array 2, a scanning face glass 3, a lens 4, and a circuit board 5. The light source of LED array 2 emits light through the glass 3 onto document. Document reflects light onto the lens 4 permitting it to be further transmitted to the circuit board 5 causing it to produce a series of electronic signals for output. However, it is not satisfactory in function to use a LED array as the light source of a CIS. The drawbacks of using a LED array as the light source of a CIS are outlined hereinafter.

1) Because a LED array is complicated to manufacture and needs much installation space, causing the manufacturing cost of the CIS relatively increased.

2) Because various individual light emitting diodes are used to set up a LED array, any quality difference among the individual light emitting diodes will affect the uniformity of the intensity of light and, the damage of either light emitting diode will cause the scanning quality to be unstable.

3) The intensity of light is indirectly proportional to square distance. However, because a LED array occupies much installation space, the distance between the LED array of a CIS and document to be scanned cannot be greatly reduced. Therefore, the LED array of a CIS must consume much power so that the intensity of the attenuated light which was reflected by document is sufficient for an accurate detection.

SUMMARY OF THE INVENTION

The present invention has been accomplished to provide a light source for a CIS (contact image sensor) which eliminates the aforesaid drawbacks. This object is achieved by means of the application of the property of electroluminescence. Electroluminescence which is the emission of cold light by certain substances when acted upon by an electric field, was discovered by G. Destrial in 1936. FIG. 2 shows a regular electroluminescent screen which comprises a foil electrode 6, an insulative layer 7 coated on the foil electrode 6, a fluorescent material 8 coated on the insulative layer 7, a transparent film electrode 9 covered on the fluorescent material 8, two absorptive films 11 respectively covered on the transparent film electrode 9 and the foil electrode 6 at two opposite sides, two water-proof layers 12 respectively covered on the absorptive films 11 at two opposite sides, and electrode terminals 10 respectively connected to the foil electrode 6 and the transparent film electrode 9. The thickness of the electroluminescent screen is below 1 mm. This structure of electroluminescent screen is commonly used in pagers and mobile telephones for background illumination.

The present invention covers an electroluminescent screen on the back side of the scanning face glass with a narrow slot left on the electroluminescent screen corresponding to the position of the lens for letting light pass. Therefore, the light source of the CIS, namely, the electroluminescent screen is spaced from document only by the scanning face glass. Light from the electroluminescent screen is transmitted through the scanning face glass onto document, then reflected by document onto the lens through the scanning face glass and the narrow slot on the electroluminescent screen and then transmitted to the circuit board. Because the present invention eliminates the installation of a LED array, the size of the CIS can be greatly reduced and the manufacturing process of the CIS can be greatly simplified. Because the distance between the light source and document is greatly reduced, less power is consumed by the electroluminescent screen to produce sufficient intensity of light for scanning. Because the electroluminescent screen is thin, uniform intensity of light is achieved.

DETAILED DESCRIPTION OF THE PREFERRED EMBODIMENT

Figure 1:
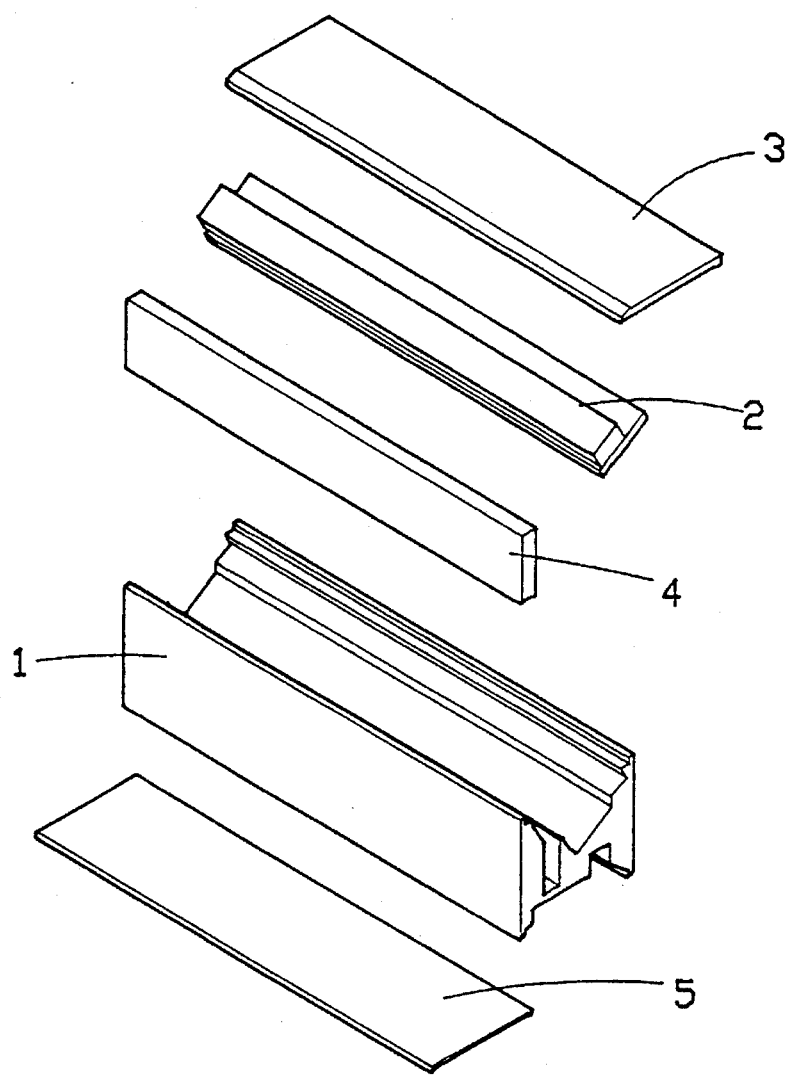
FIG. 1 is exploded and sectional views of a contact image sensor according to the prior art.
Figure 1:
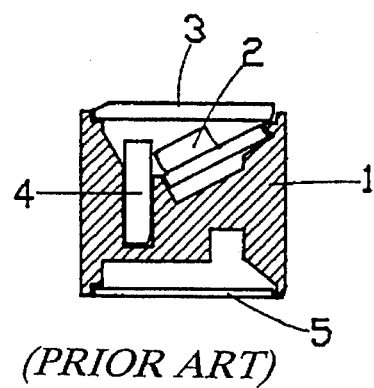
Figure 2:
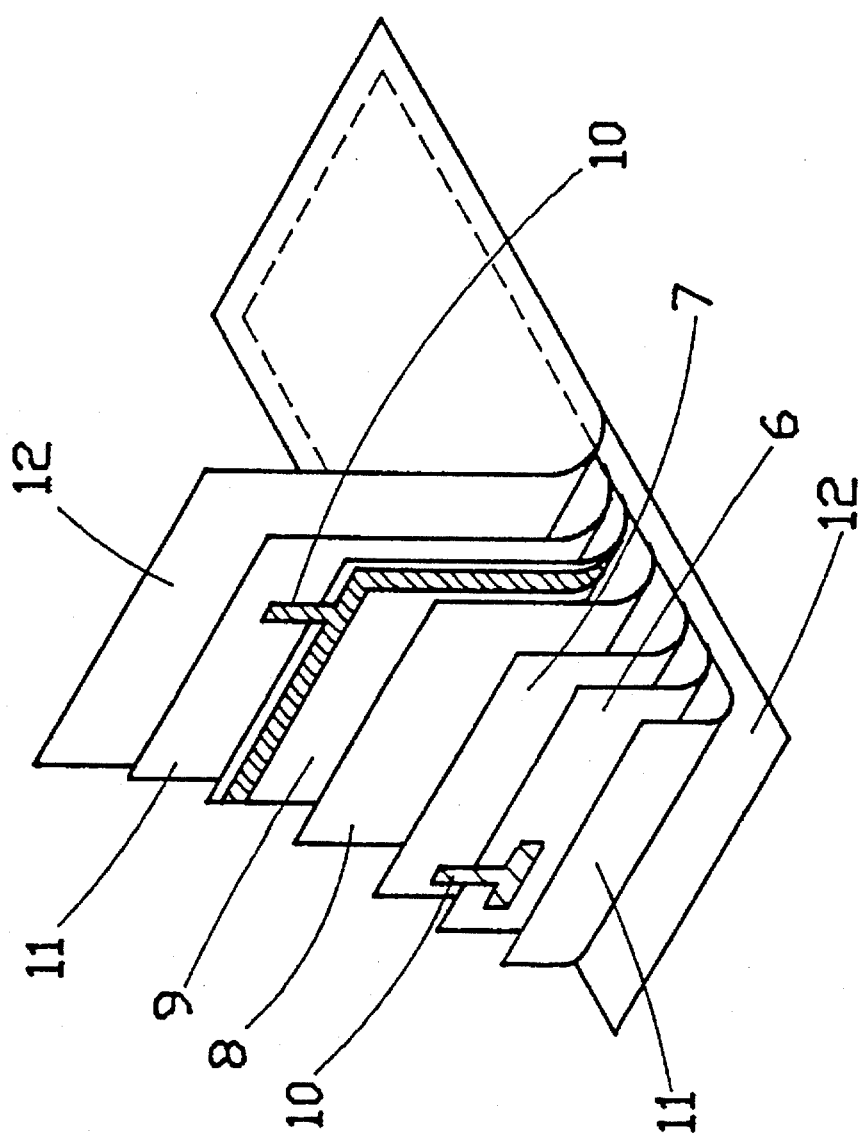
FIG. 2 shows the structure of a regular electroluminescent screen.
Figure 3:
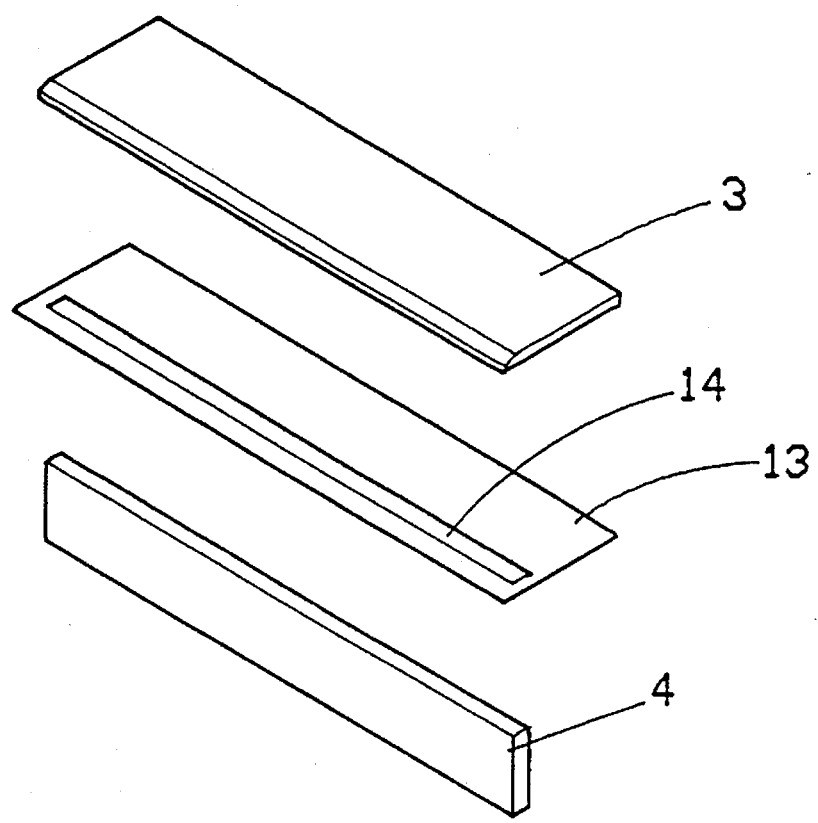
FIG. 3 is an exploded view of the present invention.
Figure 4:
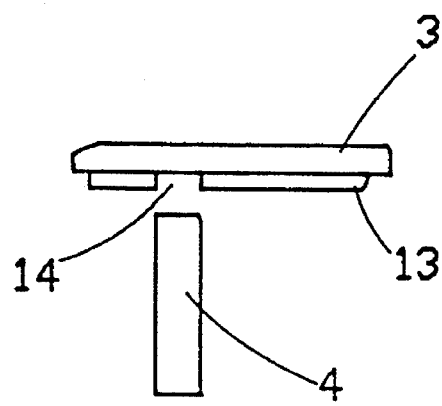
FIG. 4 is a sectional view of the present invention.

Referring to FIGS. 3 and 4, an electroluminescent screen 13 is covered on the back side of the scanning face glass 3 of a contact image sensor (not shown). The electroluminescent screen 13 has a narrow slot 14 aimed at the lens 4 of the contact image sensor for letting light be reflected by document onto the lens 4. The fluorescent material which is coated on the electroluminescent screen 13 produces a specific color of light. Therefore, a different color of light can be obtained by selecting a different fluorescent material for making the electroluminescent screen 13. The electroluminescent screen 13 may be fastened to the scanning face glass 3 either by bonding or printing. Furthermore, either AC or DC power supply can be used to act the electric field on the electroluminescent screen 13.

What is claimed is:

1. A contact image sensor, comprising an electroluminescent screen fastened to a back side of a scanning face glass of the contact image sensor and spaced apart from a lens of said contact image sensor, said electroluminescent screen acted upon by electric power to emit light onto a document to be scanned, said electroluminescent screen having a narrow slot through which reflected light from said document passes to said lens.

* * * * *